United States Patent
Hettel et al.

Patent Number: 5,977,198
Date of Patent: Nov. 2, 1999

[54] PROCESS FOR THE PRODUCTION OF RESILIENT, FLEXIBLE POLYURETHANE FOAMS

[75] Inventors: Hans Hettel, Rösrath; Peter Haas, Haan, both of Germany

[73] Assignee: Bayer Aktiengesellschaft, Leverkusen, Germany

[21] Appl. No.: 09/097,313

[22] Filed: Jun. 12, 1998

[30] Foreign Application Priority Data

Jun. 13, 1997 [DE] Germany .................. 197 25 020

[51] Int. Cl.⁶ .................................. C08G 18/48
[52] U.S. Cl. ............ 521/174; 521/128; 521/129; 521/130; 521/131; 521/137; 521/170; 521/174; 521/914
[58] Field of Search ............... 521/131, 137, 521/170, 174, 914, 128, 129, 159, 130

[56] References Cited

FOREIGN PATENT DOCUMENTS

| 0 778 301 | 6/1997 | European Pat. Off. |
|---|---|---|
| 350868 | 7/1989 | United Kingdom |
| 731120 | 9/1996 | United Kingdom |
| 95/09886 | 4/1995 | WIPO |

*Primary Examiner*—John M. Cooney, Jr.
*Attorney, Agent, or Firm*—Joseph C. Gil; N. Denise Brown

[57] ABSTRACT

This invention relates to a process for the production of resilient, flexible polyurethane foams. This process comprises reacting A) polyisocyanates or polyisocyanate prepolymers,
B) compounds having at least two isocyanate-reactive hydrogen atoms and a molecular weight of 500 to 18000,
C) optionally, compounds having at least two isocyanate-reactive hydrogen atoms and a molecular weight from 32 to 499,
D) water,
E) optionally, blowing agents,
F) activators, stabilizers and other per se known additives, and
G) one or more crosslinking agents, wherein component B) comprises
  B)i) at least one polyether polyol having of a functionality of 4 to 8 preferably of 4.5 to 8, more preferably of 5 to 7, and
  B)ii) at least one polyol containing a filler from the group of PUD-, SAN- or PIPA-modified polyols of a functionality of 2.5 to 4, and component G) comprises one or more alkanolamine crosslinking agents which correspond to the general formula $$H_mN((CH_2CHO)_nH)_{3-m}$$
$$|$$
$$R$$

in which m represents an integer between 0 and 2,
n represents an integer between 1 and 3 and
R represents a hydrogen atom or a methyl group.

14 Claims, No Drawings

PROCESS FOR THE PRODUCTION OF RESILIENT, FLEXIBLE POLYURETHANE FOAMS

BACKGROUND OF THE INVENTION

This invention relates to a process for the production of resilient, flexible polyurethane foams.

There are essentially two major groups of products which are of industrial significance as flexible and resilient cellular upholstery materials. These are, on the one hand, flexible and resilient polyurethanes and, on the other, latex foams. There are differences between the two product groups with regard to starting materials, production processes and mechanical properties and with regard to the use thereof Latex foams accordingly have a somewhat different compressive strength curve profile to DIN 53577 or ISO 3386, parts 1 and 2. Unlike polyurethane foams, latex foams do not exhibit a distinct plateau in compressive strength, but instead exhibit an almost linear increase in compressive strength within a defined compression range. This property is desirable or even necessary for certain applications. The average bulk density of latex foams is at least 60 kg/m$^3$ or usually higher, and such foams exhibit compressive strengths of between 3 and 4.5 kPa. Such grades of foam are preferably used for the production of high quality mattresses.

Polyurethane foams normally exhibit higher compressive strengths within this bulk density range and furthermore a different compressive strength/compression profile.

It would be desirable to influence the compressive strength/compression profile of polyurethane foams in such a manner that behavior similar or identical to that of latex is achieved while retaining elevated resilience. These polyurethane foams should additionally exhibit low residual deformation and low moist ageing values. This is a particularly important criterion.

DE-A 19,508,079 describes a process for the production of resilient foams of low hardness which have very good mechanical properties in the lower bulk density range.

However, using the curing process specified therein, difficulties arise in achieving the required range of properties at higher bulk densities.

Accordingly, an object of the present invention was to provide a process for the production of highly resilient polyurethane foams having behavior similar or identical to that of latex, combined with good ageing behavior, particularly moist ageing behavior. This process should consistently yield polyurethane foams having this range of properties within a bulk density range from approx. 30 to 65 kg/m$^3$.

SUMMARY OF THE INVENTION

The present invention is directed to a process for the production of flexible and resilient polyurethane foams comprising reacting A) at least one polyisocyanate or polyisocyanate prepolymer, B) one or more isocyanate-reactive compounds having at least two isocyanate-reactive hydrogen atoms and a molecular weight of 500 to 18,000, C) optionally, one or more compounds having at least two isocyanate-reactive hydrogen atoms and a molecular weight from 32 to 499, D) water, E) optionally, one or more blowing agents, F) activators, stabilizers and/or additives, and G) one or more crosslinking agents, wherein component B) comprises i) at least one polyether polyol having a functionality of 4 to 8, preferably of 4.5 to 8, more preferably of 5 to 7, and ii) at least one polyol containing a filler, the filler being selected from the group consisting of PUD-(polyurea dispersions), SAN-(styrene/acrylonitrile graft polyols) or PIPA-(polyisocyanate polyaddition with alkanolamines) modified polyols, wherein the base polyol has a functionality of 2.5 to 4, and component G) comprises one or more alkanolamine crosslinking agents corresponding to the formula

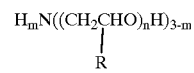

wherein:

m: represents an integer between 0 and 2, n: represents an integer between 1 and 3, and R: represent hydrogen or a methyl group.

Any per se conventional blowing agents such as, for example, hydrofluoroalkanes or alkanes, for example pentane, iso-pentane, cyclopentane, or also carbon dioxide, may optionally be used.

It is surprising that compressive strength may be reduced by the combination of the polyol components B)i) and B)ii) with the alkanolamine crosslinking agents G), which of themselves form hard segments. Process stability is not impaired even with small quantities of crosslinking agent, these quantities even being accompanied by higher hardness values.

According to the present invention, it is possible by means of the polyol combination B)i) and B)ii), together with the crosslinking component G), to simultaneously to achieve the following objectives in an advantageous manner:

(i) linear increase in compressive strength, (ii) variation in bulk density, (iii) compressive strength within the range typical of latex, (iv) low compressive deformation, and (v) low moist ageing.

In accordance with the process of the present invention, the isocyanate-reactive component B) comprises B)i) at least one polyether polyol having a functionality of 4 to 8, and B)ii) at least one polyol having a conventional functionality of 2.5 to 4 and which contains a filler structure comprising a) polyurea dispersions obtained by reacting diamines and diisocyanates in the presence of the polyol component ii), i.e. PUD dispersions, b) dispersions obtained by grafting suitable monomers such as styrene and/or acrylonitrile onto the polyol component ii), i.e. SAN polyols, or c) dispersions containing urethane groups, the dispersions being obtained by reacting alkanolamines and diisocyanates in the polyol component ii), i.e. PIPA polyols.

The filler content, based on 100% by weight of polyol component B) comprising B)i) and B)ii) is 2 to 30% by weight, preferably 3 to 15% by weight, and more preferably 3 to 10% by weight of PUD, SAN or PIPA filler. Since the filler dispersions B)ii) are generally produced such that the filler content is between 10 and 40% by weight, this must be taken into consideration appropriately. A conventional filler content of 20% by weight permits a filler content of 5% by weight, based on 100% by weight of the polyol component B), to be achieved with 25% by weight of B)ii) and 75% by weight of B)i).

Starting materials for the polyether polyols B)i) are polyols which are obtained by the addition of alkylene oxides such as ethylene oxide and propylene oxide onto more highly functional starters such as sorbitol, mannitol or sucrose, alone or in combination with starters such as ethylene glycol, propylene glycol, glycerol, trimethylolpropane or pentaerythritol, such that a functionality of between 4 and 8 may be established.

Suitable starting materials for the filled polyols B)ii) include compounds such as, for example, glycerol, trimethylolpropane, pentaerythritol, propylene glycol and ethylene glycol.

Suitable alkanolamine crosslinking agents G) include those compounds corresponding to the general formula:

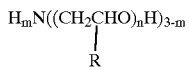

wherein:
m: represents an integer between 0 and 2,
n: represents an integer between 1 and 3, and
R: represents a hydrogen atom or a methyl group.

Some examples of suitable compounds corresponding to this general structure include compounds such as diisopropanolamine, triisopropanolamine, triethanolamine, diethanolamine, 2-hydroxyethyl-2-hydroxypropylamine, bis-(2-hydroxyethoxyethyl)amine, etc., and mixtures thereof.

It is surprising that a relatively small quantity of filler introduced via B)ii) into the polyol component B) combined with small quantities of an alkanolamine crosslinking agent G) and the more highly functional polyether polyol component B)i) results in stable foams having elevated compressive strength and indentation hardness which are otherwise obtainable only with substantially higher filler contents.

The isocyanates A) used are:

A) aliphatic, cycloaliphatic, araliphatic, aromatic and heterocyclic polyisocyanates, as are described, for example, by W. Siefken in *Justus Liebigs Annalen der Chemie*, 562, pages 75 to 136, for example those of the formula:

wherein
n: represents a number of from 2 to 4, preferably 2, and
Q: represents an aliphatic hydrocarbon residue having 2 to 18, preferably 6 to 10 carbon atoms, a cycloaliphatic hydrocarbon residue having 4 to 15, preferably 5 to 10 carbon atoms, an aromatic hydrocarbon residue having 6 to 15, preferably 6 to 13 carbon atoms or an araliphatic hydrocarbon residue having 8 to 15, preferably 8 to 13 carbon atoms.

Some examples of suitable polyisocyanates include those described in, for example, DE-OS 2,832,253, pages 10 to 11.

Particularly preferred polyisocyanates are, in general, the readily industrially available unmodified polyisocyanates such as, for example 2,4- and 2,6-tolylene diisocyanate, and/or any mixture of these TDI isomers, polyphenylpolymethylene polyisocyanates such as are produced by, for example, aniline/formaldehyde condensation and subsequent phosgenation ("crude MDI"). Polyisocyanates containing carbodiimide groups, urethane groups, allophanate groups, isocyanurate groups, urea groups or biuret groups ("modified polyisocyanates"), in particular those modified polyisocyanates derived from 2,4- and/or 2,6-tolylene diisocyanate or from 4,4'- and/or 2,4'-diphenylmethane diisocyanate may also be used. The presence thereof is not, however, specified in the process.

Component F) may comprise stabilizers such as, for example, primarily polyether siloxanes, and preferably those which are insoluble in water. These compounds are generally composed of a short-chain ethylene oxide and propylene oxide copolymer attached to a polydimethylsiloxane residue. Such foam stabilizers include those compounds as described in, for example, U.S. Pat. Nos. 2,834,748, 2,917, 480 and 3,629,308, the disclosures of which are herein incorporated by reference. Suitable catalysts F) of the type known per se are which are suitable for use in the present invention include, for example, tertiary amines, such as triethylamine, tributylamine, N-methylmorpholine, N-ethylmorpholine, N,N,N',N'-tetramethylethylenediamine, pentamethyldiethylenetriamine and higher homologues (as described in, DE-A 2,624,527 and 2 624 528, the disclosures of which are herein incorporated by reference), 1,4-diazabicyclo[2.2.2]octane, N-methyl-N'-dimethylaminoethyl-piperazine, bis-(dimethylaminoalkyl) piperazines, N,N-dimethylbenzyl-amine, N,N-dimethylcyclohexylamine, N,N-diethylbenzylamine, bis-(N,N-diethylaminoethyl) adipate, N,N,N',N'-tetramethyl-1, 3-butanediamine, N,N-dimethyl-β-phenylethylamine, 1,2-dimethylimidazole, 2-methylimidazole, monocyclic and bicyclic amines together with bis-(dialkylamino)alkyl ethers, such as 2,2-bis-(dimethylaminoethyl) ether, etc.

Other suitable catalysts F) which may be used in the present invention include those catalysts which are organometallic compounds, and, in particular, organotin compounds. Organotin compounds which may also be considered suitable include those compounds containing sulfur such as, for example, di-n-octyltin mercaptide, and preferably tin(II) salts of carboxylic acids such as, for example, tin(II) acetate, tin(II) octoate, tin(II) ethylhexoate and tin(II) laurate, and tin(IV) compounds such as, for example, dibutyltin oxide, dibutyltin dichloride, dibutyltin diacetate, dibutyltin dilaurate, dibutyltin maleate or dioctyltin diacetate.

Additional examples of suitable components to be used as F) in the present invention which may optionally also be used include additives such as, for example, foam stabilizers and cell regulators, reaction inhibitors, stabilizers, flame retardant substances, plasticizers, dyes and fillers, and fungistatic and bacteriostatic substances, etc. Specific details relating to the use and mode of action of these various additives are described in *Kunststoff-Handbuch*, volume VII, edited by Vieweg & Höchtlen, Carl Hanser Verlag, Munich 1993, 3rd edition, pages 104 to 127, the disclosure of which is herein incorporated by reference.

Production of the foams in accordance with the present invention:

In producing foams of the present invention, the reaction components may be reacted using, for example, the per se known single-stage process, the prepolymer process or the semi-prepolymer process, wherein mechanical apparatus is often used such as that described in, for example, U.S. Pat. No. 2,764,565, the disclosure of which is herein incorporated by reference. Details of production apparatus which may also be considered according to the invention are provided in, for example, *Kunststoff-Handbuch, Volume VII*, edited by Vieweg & Höchtlen, Carl Hanser Verlag, Munich 1966, pages 121 to 205, the disclosure of which is herein incorporated by reference.

The reaction of the various components generally proceeds within an isocyanate index (NCO Index) range of 90 to 130.

According to the invention, during production of the foam, foaming may also be performed in closed molds. In this case, the reaction mixture is introduced into a mold. Mold materials which may be considered suitable include, for example, metals such as, for example, aluminum, or plastics such as, for example, epoxy resin.

The foamable reaction mixture foams in the mold and forms the molding (or molded part). Mold-foaming may be performed in such a manner that the molded part has a cellular structure on its surface. It may, however, also be performed in such a manner that the molded part has a compact skin and a cellular core (i.e. an integral skin foam). According to the invention, it is also possible in this connection to introduce the foamable reaction mixture into the mold in such a quantity that the resultant foam exactly fills the mold.

It is, however, also possible to introduce more foamable reaction mixture into the mold than is necessary to fill the mold cavity with foam. This latter-stated method is accordingly known as "overcharging" and such a process is known and described in, for example, U.S. Pat. Nos. 3,178,490 and 3,182,104, the disclosures of which are herein incorporated by reference.

Mold foaming often involves the use of per se known "external mold release agents", such as silicone oils. It is, however, also possible to use so-called "internal mold release agents" (i.e. IMRs) as have been disclosed in, for example, DE-OS 2,121,670 and 2,307,589.

Preferably, however, the foams of the present invention are produced by slabstock foaming.

EXAMPLES

Description of the components used in the examples:

Polyisocyanate A: toluylene diisocyanate with 80% 2.4- and 20% 2.6-toluylenediisocyanate Polyol component i): a polyether polyol having an OH value of 28, produced by addition of 82% by weight of propylene oxide and 18% by weight of ethylene oxide onto sorbitol as a starter compound, and having predominantly primary OH end groups Polyol component ii)1): a PUD filled polyol having an OH value of 28, comprising a 20% by weight dispersion of tolylene diisocyanate and hydrazine, in a polyether polyol prepared from 83% by weight of propylene oxide and 17% by weight of ethylene oxide onto trimethylolpropane as a starter compound, and having predominantly primary OH end groups.

Polyol component ii)2): a SAN filled polyol having an OH value of 28, comprising a 20% dispersion prepared from a polyol grafted with 60% by weight of acrylonitrile and 40% by weight of styrene, with trimethylolpropane as a starter compound and 83% by weight of propylene oxide and 17% by weight of ethylene oxide, and having predominantly primary OH end groups.

Crosslinking component G
G1): triethanolamine
G2): diisopropanolamine

TABLE 1

| No | 1 | 2 | 3 | 4 | 5 | 6 | 7 |
|---|---|---|---|---|---|---|---|
| Polyol i) | 75 | 75 | 75 | 75 | 75 | 75 | 75 |
| Polyol ii)1) | 25 | 25 | 25 | 25 | 25 | 25 | — |
| Polyol ii)2) | — | — | — | — | — | — | 25 |
| Crosslinking agent G1) | 0.5 | 1.0 | 1.5 | 0.5 | 1.0 | 1.5 | 0.5 |
| Crosslinking agent G2) | 0.5 | 1.0 | 1.5 | 0.5 | 1.0 | 1.5 | 0.5 |
| Stabilizer KS 53 (Bayer AG) | 0.25 | 0.25 | 0.25 | 0.25 | 0.25 | 0.25 | 0.25 |
| Dabco 33 LV | 0.1 | 0.1 | 0.1 | 0.1 | 0.1 | 0.1 | 0.1 |
| Desmorapid SO (Bayer AG) | 0.15 | 0.15 | 0.15 | 0.15 | 0.15 | 0.15 | 0.15 |
| Water | 2.0 | 2.0 | 2.0 | 3.0 | 3.0 | 3.0 | 2.0 |
| Polyisocyanate A | 28.45 | 30.4 | 32.2 | 39.5 | 41.3 | 43.1 | 28.4 |
| NCO Index | 113 | 113 | 113 | 113 | 113 | 113 | 113 |
| Mechanical Properties | | | | | | | |
| Bulk density (kg/m$^3$) | 47 | 43 | 41 | 31 | 30 | 31 | 46 |
| Compressive strength DIN 53576, 40% compression (kPa) | 4.9 | 3.6 | 3.2 | 3.4 | 2.8 | 2.4 | 4.9 |
| Indentation hardness DIN 53576, 40% compression (N) | 213 | 153 | 126 | 150 | 119 | 102 | 215 |
| Compression set (90% compression | 1.7 | 2.8 | 3.6 | 3.9 | 4.0 | 3.1 | 1.8 |
| Moist aging | | | | | | | |
| 22 h, 70° C., 50% atmospheric humidity | 2.7 | 4.0 | 5.0 | 6.3 | 6.2 | 5.3 | 2.8 |
| 22 h, 40° C., 95% atmospheric humidity | 2.6 | 2.8 | 4.0 | 6.2 | 7.4 | 7.0 | 2.5 |
| Rebound resilience (%) | 62 | 62 | 62 | 46 | 54 | 56 | 62 |

Due to the polyol combination of B)i) and B)ii), in combination with the alkanolamine crosslinking agents G), foams similar to latex are obtained at extraordinarily low filler contents of 5% by weight, based on 100% by weight of component B). The compression strength curve of these foams rises virtually without plateaux. It is surprising that distinctly higher hardness is achieved with smaller quantities of crosslinking agent G). Ageing values, in particular for values for moist ageing, are exceptionally good. Accordingly, the present invention provides a foam suitable for high quality mattress applications which, at a moderate bulk density, exhibits properties similar to those of higher bulk density latex foam.

Moreover, processing is straightforwardly reliable over a broad range of bulk densities and hardness values.

If the polyol B)i) according to the invention is replaced with a polyol having an OH value of 28 and prepared from 82% by weight of propylene oxide and 18% by weight of ethylene oxide, but with trimethylolpropane as the starter (instead of sorbitol), and having predominantly primary OH end groups, this results in an unstable raw material mixture being obtained which is not foamable using the present conditions.

The following comparison reveals the difference in mechanical properties in comparison with foams hitherto produced using conventional HR methods:

If the formulations described in Examples 4 and 5 above are repeated at a compressive strength of 3.4 and 2.8 kPa, respectively, and at a filler content of 20% and 10% by weight, respectively, and a bulk density of 30 kg/m$^3$ based on the above described trifunctional polyether polyol with an alkanolamine crosslinking comprising diethanolamine, foams exhibiting moist ageing values of between 12 and 15% are obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of flexible, resilient polyurethane foams comprising reacting:
    A) at least one polyisocyanate or polyisocyanate prepolymer,
    B) one or more isocyanate-reactive component having at least two isocyanate-reactive hydrogen atoms and a molecular weight of 500 to 18,000,
    C) optionally, one or more compounds having at least two isocyanate-reactive hydrogen atoms and a molecular weight from 32 to 499,
    D) water,
    E) optionally, blowing agents,
    F) activators, stabilizers and/or additives, and
    G) one or more crosslinking agents;
wherein component B) consists of:
    i) at least one polyether polyol having a functionality of 4 to 8, contains predominately primary OH end groups, has an ethylene oxide content of 10 to 30% by weight, based on 100% by weight of alkylene oxide content, and has an equivalent weight of 100 to 4,000: and
    ii) at least one polyol containing a filler, said filler being selected from the group consisting of PUD-, SAN-, and PIPA-modified polyols, wherein the base polyol has a functionality of 2.5 to 4,
and component G) comprises at least one alkanolamine crosslinking agent corresponding to the general formula:

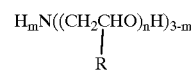

wherein:
    m: represents an integer between 0 and 2,
    n: represents an integer between 1 and 3, and
    R: represents a hydrogen atom or a methyl group.

2. The process of claim 1, wherein the functionality of component B)i) is 4.5 to 8.

3. The process of claim 1, wherein the functionality of component B)i) is 5 to 7.

4. The process of claim 1, wherein component B)ii) comprises a polyol containing a polyurea dispersion.

5. The process of claim 1, wherein component B)ii) comprises a polyol containing a SAN dispersion.

6. The process of claim 1, wherein component B)ii) comprises a polyol containing a PIPA dispersion.

7. The process of claim 1, wherein component B) comprises 60 to 90% by weight, based on 100% by weight of B), of component B)i); and 10 to 40% by weight, based on 100% by weight of B), of component B)ii), and wherein the total filler content comprises 2 to 30% by weight, based on 100% by weight of B).

8. The process of claim 1, wherein component G) said alkanolamine crosslinking agents is selected from the group consisting of tertiary alkanolamines, secondary alkanolamines, and mixtures thereof.

9. The process of claim 1, wherein component G) said alkanolamine crosslinking agent comprises triethanolamnine.

10. The process of claim 1, wherein component G) said alkanolamine crosslinking agent comprises diisopropanolamine.

11. The process of claim 1, wherein component G) said alkanolamine crosslinking agent comprises a mixture of triethanolamine and diisopropanolamine.

12. The process of claim 1, wherein component A) said polyisocyanate comprises tolylene diisocyanate.

13. The process of claim 1, wherein component A) said polyisocyanates or polyisocyanate prepolymers comprise tolylene diisocyanate, diphenylmethane diisocyanate, prepolymers thereof, and mixtures thereof, optionally modified by urethane, urea, biuret, allophanate, carbodiimide and/or uretdione groups.

14. The process of claim 1, wherein E) said blowing agent comprises carbon dioxide, hydrofluoroalkanes, alkanes having 4 to 5 carbon atoms, and mixtures thereof.

* * * * *